United States Patent [19]

Yomtoubian

[11] Patent Number: 5,914,967
[45] Date of Patent: Jun. 22, 1999

[54] METHOD AND APPARATUS FOR PROTECTING DISK DRIVE FAILURE

[75] Inventor: Ruben Yomtoubian, Saratoga, Calif.

[73] Assignee: Hitachi Computer Products (America), Inc., Santa Clara, Calif.

[21] Appl. No.: 08/785,754

[22] Filed: Jan. 18, 1997

[51] Int. Cl.[6] .................................................. G11C 29/00
[52] U.S. Cl. ...................... 371/21.1; 371/21.6; 369/54; 369/58
[58] Field of Search ................................ 371/21.1, 21.2, 371/21.6; 369/54, 58; 395/183.06, 183.15, 183.18

[56] References Cited

U.S. PATENT DOCUMENTS

| | | | |
|---|---|---|---|
| 4,967,155 | 10/1990 | Magnuson | 324/212 |
| 4,969,139 | 11/1990 | Azumatani et al. | 369/54 |
| 5,047,874 | 9/1991 | Yomtoubian | 360/25 |
| 5,075,804 | 12/1991 | Deyring | 360/49 |
| 5,210,860 | 5/1993 | Pfeffer et al. | 371/21.1 |
| 5,271,018 | 12/1993 | Chan | 371/10.2 |
| 5,422,890 | 6/1995 | Klingsporn et al. | 371/21.6 |
| 5,530,687 | 6/1996 | Yamaguchi | 369/54 |
| 5,557,183 | 9/1996 | Bates et al. | 361/23 |

*Primary Examiner*—Hoa T. Nguyen
*Attorney, Agent, or Firm*—Graham & James LLP

[57] ABSTRACT

The present invention is a method and apparatus for predicting the future failure of a disk drive. Structurally, the present invention is implemented as a series of diagnostic and statistical routines contained in a ROM on the logic board of a disk drive. The routines detect errors that occur during normal operation of the disk drive and issue a warning if the number of errors or the rate at which errors occur has exceeded predetermined levels. In addition to monitoring errors that occur during normal operation, the diagnostic routines may be activated to test for the presence of recoverable errors. Recoverable errors are detected by running a series of diagnostic tests after enabling error detection and disabling error correcting codes as well as device retries. Once again, a warning is issued if the number of errors or the rate at which errors occur has exceeded predetermined levels. Finally, the present invention may be used in combination with a list of suspected sectors that has been previously compiled by an internal disk tester. In such cases, the suspected sectors are periodically re-tested and a warning issued if the number of errors, or the rate of errors has exceeded predetermined levels. At the conclusion of testing, the drive is restored to its normal operating configuration with error correcting codes and device retries enabled.

26 Claims, 6 Drawing Sheets

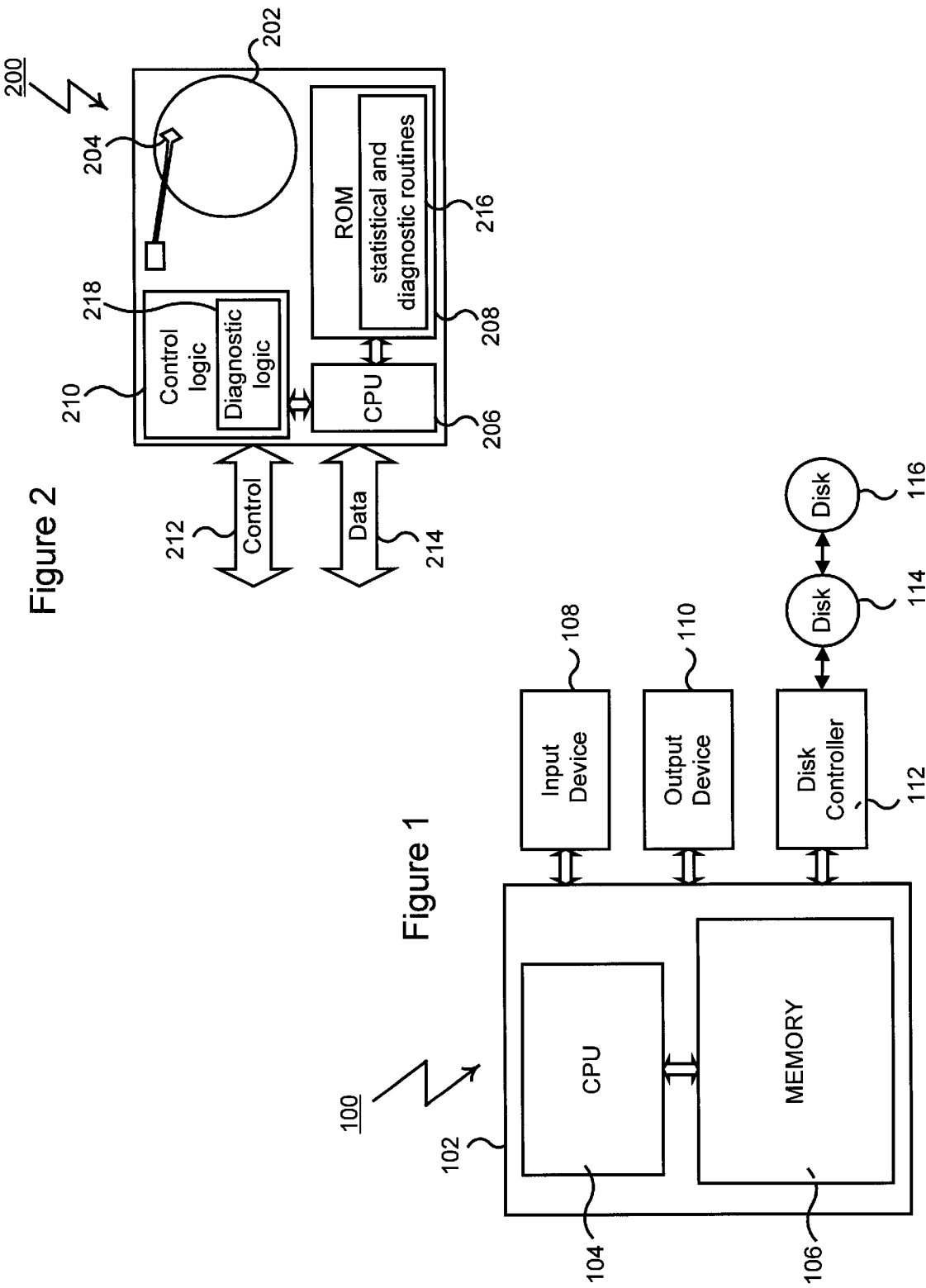

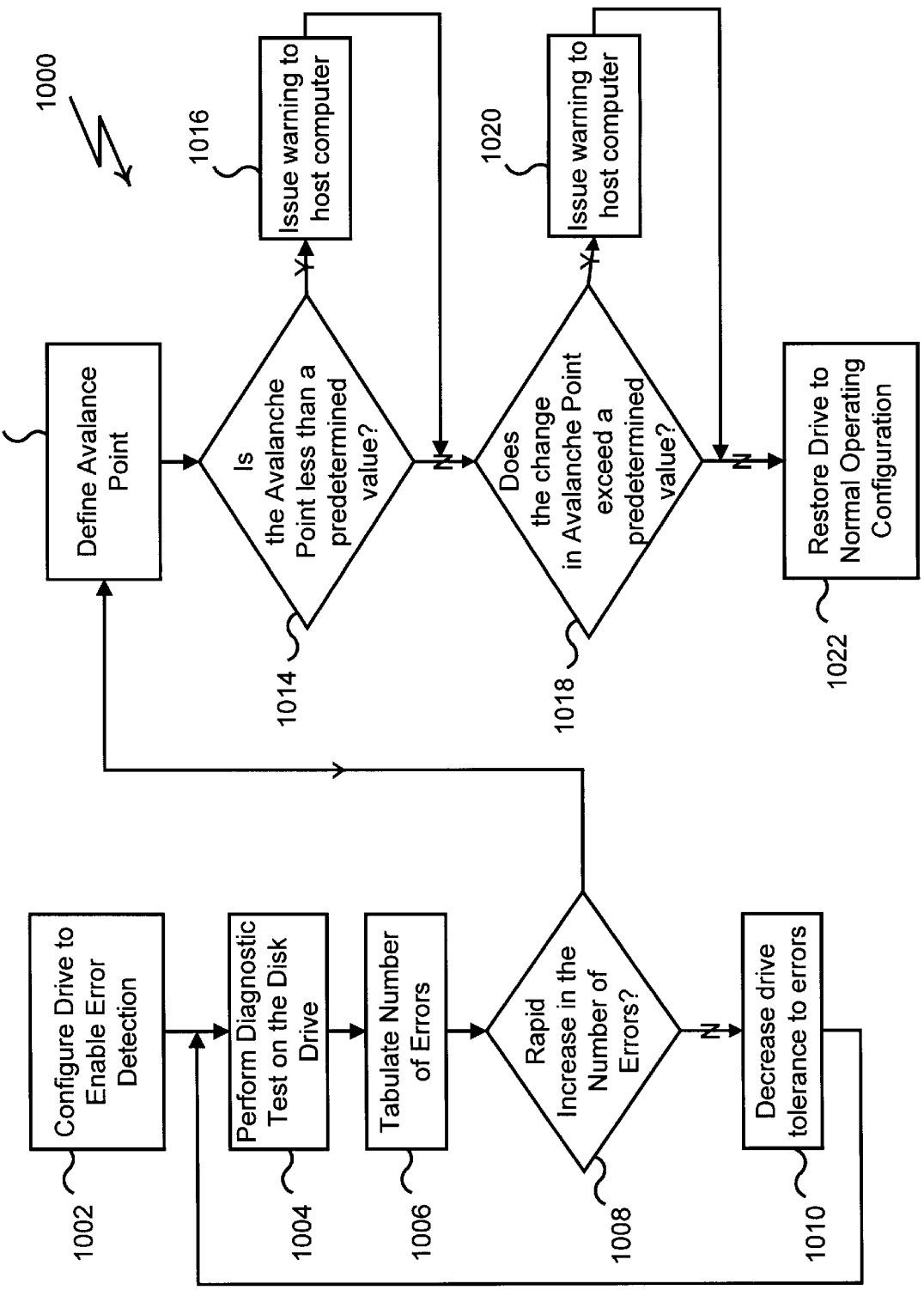

METHOD AND APPARATUS FOR PROTECTING DISK DRIVE FAILURE

FIELD OF THE INVENTION

This present invention relates to techniques for protecting the integrity of information stored on computer disk drives. More specifically, the present invention is a method and apparatus for issuing a warning indicating that a computer disk drive will fail in the near future.

BACKGROUND OF THE INVENTION

In certain circumstances, it is very important that a computer system perform reliably. For example, some real time computer systems control complex and sometimes dangerous production processes. Failure within systems of this type may have adverse consequences both for the products being produced as well as for the health and safety of the surrounding environment. As another example, computer systems are often used in mission critical roles, such as in the controlling of air traffic. Once again, failure within these systems may have extremely serious consequences. Of course, even in cases where the failure of a computer system is not dangerous, failure may still be inconvenient or expensive. As a result, it is desirable to be able to detect ahead of time when a component, such as a hard disk drive, might fail, and to take measures to deal with the component before failure occurs.

Normally, computer hard disks are subject to a number of different analog and digital tests as part of the manufacturing process. Traditionally, these tests are performed by devices known as drive testers, a process that has several disadvantages. One such disadvantage associated with traditional disk drive testers is the inability of such devices to provide the type of failure prediction that may be usefully employed in high reliability computing environments. More specifically, it is generally the case that disk drives experience an increasing number of defects over the life-span of the drive. These defects, which arise after the drive has left the manufacturing environment, are known as "grown defects" and are important indicators of the health of an operating disk drive. For example, a drive that exhibits a large number of grown defects may be considered to be unusable. Alternatively, a rapidly increasing number of grown defects may indicate that the drive is about to experience a catastrophic failure. Unfortunately, it is often impractical to remove a functioning drive from a computer system so that it may be analyzed on a drive tester. Thus, there is a need for drive that can self-test and monitor its operational and test errors.

SUMMARY OF THE INVENTION

The present invention is a method and apparatus that allows a computer disk drive to detect, ahead of time, the occurrence of catastrophic failure. In such cases a warning may be issued to the computer system allowing the operator to take remedial action.

Structurally, the present invention is implemented as a series of statistical and diagnostic routines that are included in ROM on the logic board of a disk drive. These routines are designed to work without special hardware modifications, but may be enhanced if additional hardware is included to decrease the tolerance of the drive to defects within the drive media. The routines are controlled by specials commands passed by the host computer to the disk drive via the I/O bus that connects the drive to the host computer. By using these commands, the host computer may cause the diagnostic and statistical routines to inspect and analyze the disk drive in several different ways.

For one mode of analysis, the present invention monitors and collects recoverable and non-recoverable errors experienced by the disk drive during normal operation. Each time one of these errors is collected, an entry is written on a reserved portion of the disk describing the particular type of error and the time at which the error occurred. Periodically, the collected errors are analyzed to determine if the number of errors has exceeded a first predetermined value or if the rate of errors has exceeded a second predetermined value. In either case, a warning is issued to the host computer system, allowing the operator to take precautionary measures.

For a second mode of analysis, the present invention waits for a period when the drive is otherwise idle. The drive is then reconfigured for the detection of recoverable errors. Generally, this is performed by enabling error detection, disabling device retries and disabling the use of error correcting codes. With the drive reconfigured, a series of diagnostic routines are run. These "background" tests may be read only tests, or may be write/read tests that use a reserved portion of the disk drive. Each time an error is detected during these tests, it is saved as an entry in the reserved portion of the disk drive. Errors collected during background testing are analyzed periodically to determine if the number of errors has exceeded a first predetermined value or if the rate of errors has exceeded a second predetermined value. In either case, a warning is issued to the host computer system allowing the operator to take precautionary measures. At the conclusion of background testing, the drive is restored to its normal operating condition by disabling error detection, enabling device retries and enabling the use of error correcting codes.

In accordance with the purpose of the invention, as embodied and broadly described herein, the invention is a method for predicting the future failure of a disk drive, the method comprising the steps of: monitoring errors generated during normal operation of the disk drive, adding an entry noting each error to an error list stored on a reserved portion of the disk, periodically analyzing each entry in the error list to determine if the number of errors has exceeded a first predetermined value, and periodically analyzing each entry in the error list to determine if the rate of errors has exceeded a second predetermined value.

In further accordance with the purpose of this invention, as embodied and broadly described herein, the invention is an apparatus for predicting the future failure of a disk drive, the apparatus comprising: program means for periodically performing diagnostic tests on the disk drive, program means for monitoring errors generated during the diagnostic tests, program means for adding an entry noting each error to an error list stored on a reserved portion of the disk, program means for periodically analyzing each entry in the error list to determine if number of errors has exceeded a first predetermined value, and/or program means for periodically analyzing each entry in the error list to determine if the rate of errors has exceeded a second predetermined value.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 1 is a block diagram of a data processing system in accordance with a preferred embodiment of the present invention.

FIG. 2 is a block diagram of a disk drive in accordance with the present invention.

FIG. 10 is a flow chart showing the steps associated with the avalanche testing method of the present invention.

DETAILED DESCRIPTION OF THE PREFERRED EMBODIMENTS

Figure 5:
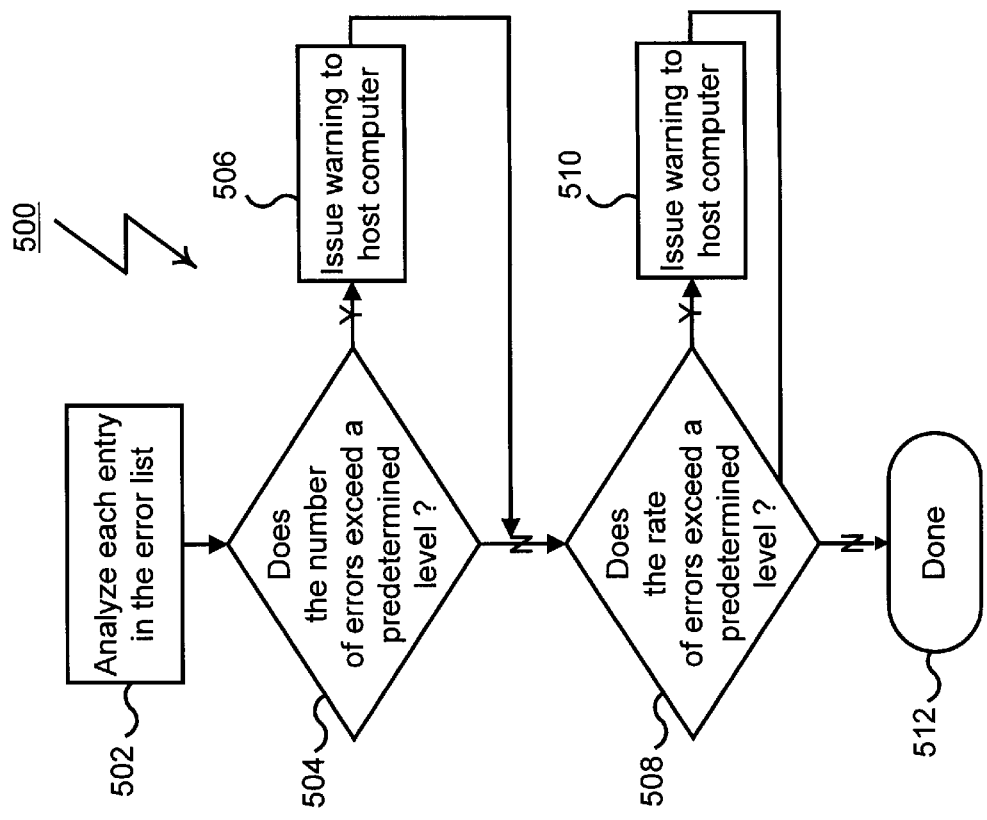
FIG. 5 is a flow chart showing steps performed in the error analysis method of the present invention.

Reference will now be made in detail to the preferred embodiments of the invention, examples of which are illustrated in the accompanying drawings. Wherever possible, the same reference numbers will be used throughout the drawings to refer to the same or like parts.

The present invention is a method and apparatus for predicting the future failure of a disk drive. In FIG. 1, a data processing system 100 is shown as a representative environment for the present invention. Structurally, the data processing system 100 includes a host computer 102 that, in turn, includes a central processing unit, or CPU 104, and memory 106. An input device 108 and an output device 110 are connected to the host computer 102 and represent a wide range of varying I/O devices such as keyboards, modems, network adapters, printers and displays. FIG. 1 also shows that a disk controller 112 is connected to the host computer 102 and that a first disk drive 114 and a second disk drive 116 are connected to the disk controller 112. Disk controller 112, first disk drive 114 and second disk drive 116 are, of course, representative and may be implemented as SCSI or other standardized devices.

Turning now to FIG. 2, a representative hard disk drive is shown and generally designated 200. Hard disk drive includes a disk assembly 202 and a read/write head assembly 204. Both disk assembly 202 and read/write head assembly 204 are shown generically, indicating that the present invention may be used in combination with a variety of disk drive technologies. Drive 200 also includes a central processing unit, or CPU 206, a read-only memory, or ROM 208, and control logic 210. Finally, drive 200 is shown to include a control bus 212 and a data bus 214. Fundamentally, the disk drive 200 functions to transfer data between disk assembly 202 and data bus 214 in response to commands passed over control bus 212. The transfer of this data is coordinated by CPU 206 that responds to each command on control bus 212 by executing program routines stored in ROM 208. As CPU 206 executes the routines stored in ROM 208, the CPU 208 manipulates the control logic 210 that, in turn, causes the disk drive 200 to move data between the data bus 214 and the disk assembly 202.

For the present invention, a set of statistical and diagnostic routines 216 are stored in ROM 208. Additionally, a diagnostic logic section 218 is added to the control logic 212. The diagnostic routines 216 and diagnostic logic 218 allow the present invention to predict the future failure of the disk drive 200 using several related methods.

Figure 3:
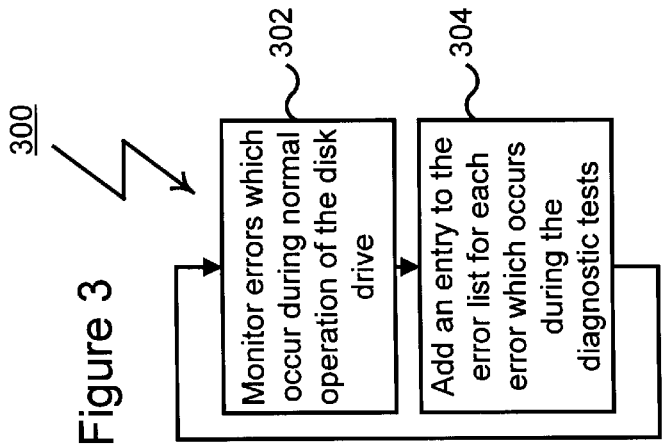
FIG. 3 is a flow chart showing the steps associated with the continuous testing method of the present invention.

A first failure prediction method is shown in FIG. 3 and generally designated 300. As shown, method 300 includes step 302 which corresponds generally to the monitoring of errors that occur during normal operation of the disk drive 200. More specifically, it is well known that disk drive mechanisms, such as drive 200, experience a number of errors during normal operation. These errors may be classified as hard errors, or errors where no recovery is possible, and soft errors, where data is damaged but may be recovered through the use of error correcting codes, or ECC. During normal drive operation, some of these errors, such as soft errors, can be ignored. For the purposes of the diagnostic routines 216, however, each error may have significance. Step 302 represents the steps required to enable monitoring of each error experienced by drive 200, including errors that would otherwise be corrected and ignored.

Figure 4:
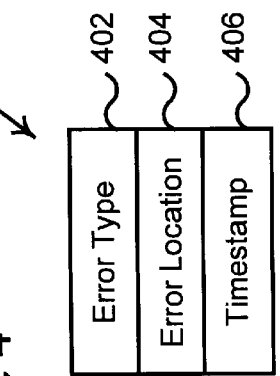
FIG. 4 is a block diagram of an error entry of the present invention.

In the following step, step 304, each error noted in step 302 is added to a list of errors. More specifically, for each error noted in step 302, an error entry is created. An entry 400 of this type is shown in FIG. 4 and includes a number of data fields that describe the particular error. These data fields include: a type field 402 for information indicating the type of error, a location field 404 for information about the physical location where the error occurred, and a time-stamp 406 for information recording the time at which the error occurred. Each error entry 400 is added to the error list and stored in a reserved portion of the disk assembly 202, completing the error processing associated with step 304. Preferably, steps 302 and 304 are executed continuously during the operation of drive 200.

Typically, disk drive 200 will maintain a list of sectors that have been found to be defective after the disk drive has left the manufacturing environment. This list is known as a grown defect list. In cases where disk drive 200 maintains a grown defect list of this type, it will generally be practical to include the error entries 400 generated by method 300 as part of the list of grown defects. This may be accomplished by augmenting, if necessary, the information included in the entries included in the grown defect list.

In concert with the error reporting steps shown in FIG. 3, the present invention includes an error analysis method shown in FIG. 5 and generally designated 500. The error analysis method 500 begins with step 502 where each error entry 400 in the error list is analyzed. The analysis of step 502 includes the generation of a count of all entries 400 in the error list. Additionally, the entries 400 in the error list are examined to determine the rate at which errors have occurred during recent operation of the drive 200. This examination may be performed by examining the timestamp 406 included in each entry 400. Alternatively, the total number of entries 400 may be tabulated and compared to the total number of entries tabulated during the last invocation of method 500. With regard to determining the rate at which errors have occurred, it may be appreciated that various mathematical formulas may be employed to determine various "rates." For the purposes of the present invention, however, it is generally sufficient to simply tabulate the number of errors that have occurred in a preceding interval of a predetermined duration. For example, an error rate may be calculated by tabulating the number of errors that have occurred in the last one-hundred hours of operation.

At the completion of step 502, a determination is made, in step 504, as to whether the number of error entries 400, exceeds a first predetermined level. If so, processing continues at step 506 where a warning is issued to the host computer 102. This warning may be communicated to the host computer 102 using a variety of methodologies. In general, however, it will be performed by altering a status register or other device within drive 200 that is regularly queried by the host computer 102 during normal operation of the drive 200.

In step 508 the rate of errors, calculated in step 502, is compared to a second predetermined level. In cases where the error rate exceeds the second predetermined level, processing continues at step 510 where, once again, a warning is issued to the host computer 102. Regardless of whether a warning is issued in step 510, control resumes at box 512 indicating completion of the error analysis method 500. In some cases, it may be preferably to increase the statistical relevancy of method 500. This can be accomplished by issuing a warning in step 506 only if the number of errors exceeds the first predetermined level for a preset number of invocations of method 500. This prevents an aberrant error total from resulting in a false warning. A similar requirement may be applied to the warning of step 510 by requiring that the error rate exceed the second predetermined level for a preset number of invocations of method 500. Once again, this prevents a aberrant error total from resulting in a false warning.

As discussed, method 300 is preferably executed continuously during the operation of drive 200. Error analysis method 500, on the other hand, is preferably intended to be run at periodic intervals. In this fashion, the errors recorded by method 300 are periodically analyzed by method 500 to determine whether a warning, indicating possible failure of disk 200, should be issued to host computer 102.

Figure 6:
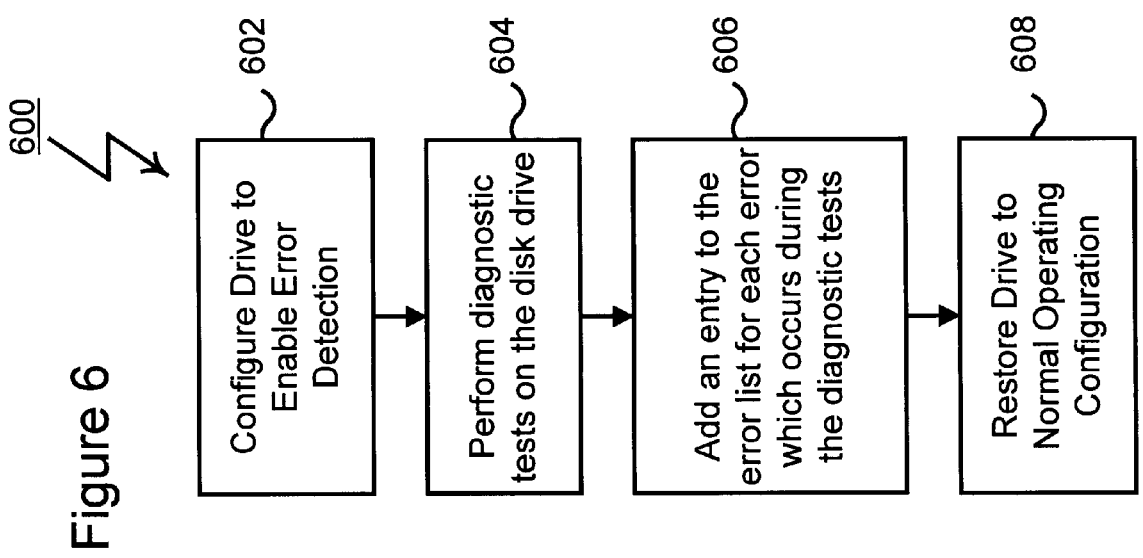
FIG. 6 is a flow chart showing the steps associated with the background testing method of the present invention.

A second failure prediction method is shown in FIG. 6 and generally designated 600. Method 600 begins with step 602 where the disk drive 200 is configured by the statistical and diagnostic routines 216 and diagnostic logic section 218 to enable the detection of recoverable errors. More specifically, it is generally the case that disk drives, such as disk drive 200, have a number of features that prevent or mask the occurrence of recoverable errors. These include the use of error correcting codes as well as routines that cause operations that fail initially to be retried multiple times. In step 602, these error correcting and masking techniques are disabled. Specifically, in step 602 device retries and error correcting codes are disabled. In the same step, error reporting is enabled.

In step 604 diagnostic tests are performed on the disk drive 200. For the purposes of the present invention, several different types of diagnostic tests may be used for step 604. These test types are discussed with greater particularity hereinafter. For the purposes of the current discussion, however, it is adequate to appreciate that step 604 involves the activation of various diagnostic tests performed by the CPU 206 which test sectors within the disk 202 of the disk drive 200.

In step 606, each error generated by the diagnostic tests of step 604 is added to a list of errors. More specifically, for each error generated in step 604, an error entry 400 is created and stored in a reserved portion of the disk assembly 202. After storing each error, control passes to step 608 where the drive 200 is reconfigured to its normal operating configuration. This involves enabling the use of device retries, enabling the use of error correcting codes, as well as enabling any of the other techniques used by the drive 200 to prevent or mask the occurrence of errors. As may be readily appreciated, there are some similarities between method 600 and method 300. It should be noted, however, that method 600 is preferably not intended to be a continuous process. Instead, method 600 is preferably intended to be run intermittently during times in which the drive is otherwise idle.

Method 600 may work in combination with method 300, or, as an alternative to method 300. In either case, the errors stored in the error list during step 606 are analyzed using the same methodology (i.e. the error analysis method 500 of FIG. 5) employed for the errors stored during step 304. As a result, warnings will be issued if the diagnostic tests of step 604 uncover an excessive number of errors or if the diagnostic tests of step 604 uncover an excessive rate of errors. Alternatively, any type of statistical process control methodology may be employed to determine if the disk drive 200 is experiencing an excessive number of errors.

Figure 7:
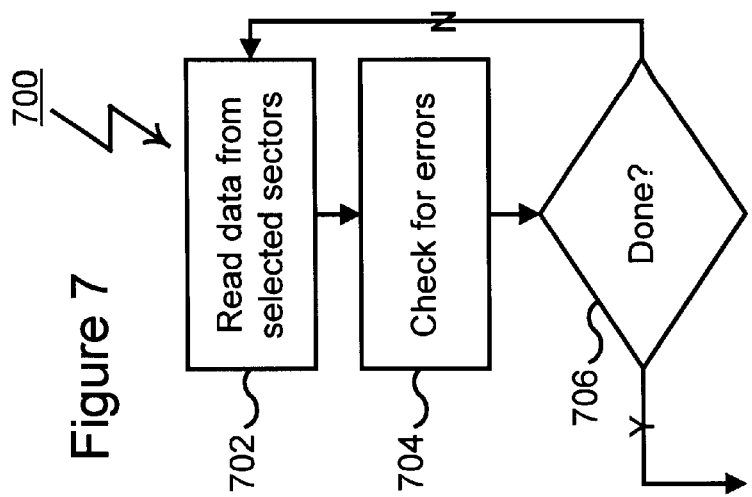
FIG. 7 is a flow chart showing the first diagnostic method as used in combination with the background testing method of FIG. 6.
Figure 9:
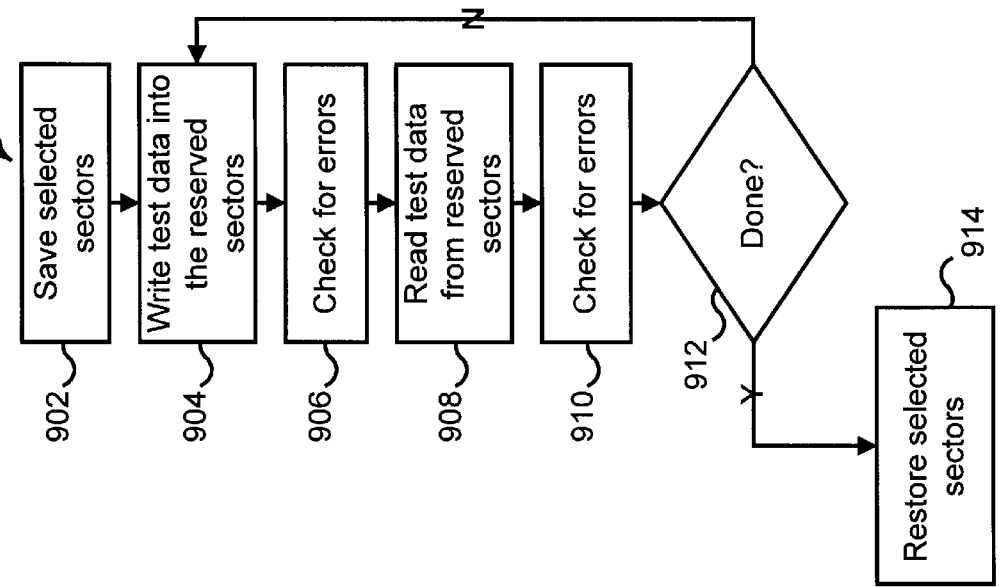
FIG. 9 is a flow chart showing the third diagnostic method as used in combination with the background testing method of FIG. 6.
Figure 8:
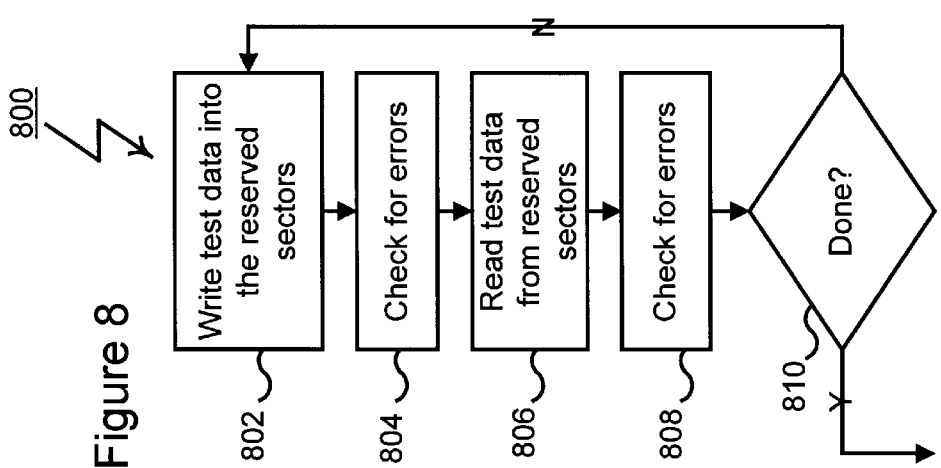
FIG. 8 is a flow chart showing the second diagnostic method as used in combination with the background testing method of FIG. 6.

FIGS. 7, 8 and 9 illustrate three different types of diagnostic tests that may be used as the diagnostic test of step 604. Turning initially to FIG. 7, it may be seen that diagnostic test 700 includes steps 702, 704 and 706 which are repeatedly executed as a loop. In the first step, step 702, a selected sector of disk 202 is read one or more times. In step 704, the read operations of step 702 are checked to determine if an error has occurred. In general, error checking of this type is performed automatically by the disk drive 200. In other cases, it may be necessary for the diagnostic routines to query status registers or other devices to ascertain whether an error has occurred. In either case, step 704 represents the execution of whatever steps are required by the specific hardware of drive 200 to determine whether an error has occurred in the preceding read operations of step 702.

Step 706, the final step of diagnostic 700, is a loop test that allows the entire diagnostic to be repeated. In general, it will be desirable to repeat the read diagnostic multiple times, with each iteration testing a new sector of the disk assembly 202. Step 706 may terminate the diagnostic 700 when a predetermined number of iterations has been reached, when a predetermined time limit has expired, or when a predetermined number of sectors of the disk 202 have been tested.

In some cases, it may be preferable to use the read-only diagnostic method 700 of FIG. 7 in combination with a list of suspected sectors. A list of suspected sectors is a list of disk sectors, where each sector in the list is a sector that functions without error under normal operating conditions. Each suspect sector is, however, prone to errors under the more adverse operating conditions. For this reason, suspected sectors are considered to be more likely to fail than non-suspected sectors. The list of suspected sectors may be created in any convenient manner, for example in the manner described in a co-pending, commonly owned application, U.S. application Ser. No. 08/771,985, filed concurrently herewith, entitled "Inline Disk Tester" of Ruben Yomtoubian, the disclosure of which is incorporated herein by reference.

In the context of method 700, the list of suspected sectors may be used to demarcate the sectors within the disk 202 that will be tested in step 702. This is accomplished by using, in turn, each sector in the list of suspected sectors as the sector tested in step 702. In this way method 700 may be limited to testing those parts of the disk 202 that are considered to be prone to failure. Suspected sectors that fail during testing are known as "delta defects." Typically, delta defects may be maintained in a separate list of delta defects. The list of delta defects may then be analyzed, using method 600, to determine if the number of delta defects, or if the rate of delta defects is excessive.

As described above, the list of suspected sectors is used to generate the list of delta defects. The list of suspected sectors may also be analyzed directly, using method 600. More specifically, for the purposes of the present invention, the list of suspected sectors may be recreated at periodic times during the operation of disk drive 200. The list of suspected sectors may then be analyzed, using method 600, to determine if the number of suspected sectors, or if the rate of suspected sectors is excessive.

Turning now to FIG. 8, a write/read diagnostic is shown and generally designated 800. For write read/diagnostic 800, some portion of the disk assembly 202 is reserved for the purposes of diagnostic testing. These portions of the disk assembly 202 are used in step 802 where data test patterns are written into the reserved portions. The writing of the test patterns of step 802 is followed by step 804 where each write operation is tested for possible error conditions.

Each sector written in step 802 is then read in step 806. The read operations are tested for errors in 808. Effectively, then, diagnostic 800 tests both writing and reading of the disk assembly 202. At the completion of the error checking of step 808, the diagnostic 800 may be repeated under control of step 810. Step 810 will generally cause the diagnostic 800 to be repeated for a number of test patterns and a number of different sectors within the reserved portion of the disk 202. Diagnostic 800 may also be terminated at the expiration of a predetermined number of iterations or a predetermined time limit or for any number of other reasons.

In FIG. 9, a modified write/read diagnostic is shown and generally designated 900. Modified write/read diagnostic 900 includes all of the steps described for write/read diagnostic 800. For the sake of brevity, therefore, these steps will not be re-described. Unlike diagnostic 800, however, diagnostic 900 does not write and read test patterns into a reserved portion of the disk. Instead, for modified write/read diagnostic 900, sectors of the disk assembly 202 are chosen to be test sectors. In step 902, these sectors are saved into a reserved portion of the disk. In the following steps, the selected sectors are written and then read with error checking for both the write and read operations. At the completion of diagnostic 900, the selected sectors used for testing are restored from the reserved portion of the disk as indicated in step 914.

For a third failure prediction method, the present invention utilizes a technique described as "avalanche testing." For avalanche testing, a portion of the disk 202 is repeatedly tested. During this testing, run-time parameters within the drive 200 are adjusted to make the drive 200 less tolerant to defects within the media of the disk 202. Generally, each incremental decrease in tolerance results in a corresponding incremental increase in the number of sectors of the disk 202 that produce errors during the testing process. As some point, however, further incremental decreases in tolerance become associated with large increases in the number or errors detected during the testing process. This point is known as the avalanche point.

A third failure prediction method, using avalanche testing, is shown in FIG. 10 and generally designated 1000. Method 1000 begins with step 1002 where the drive 200 is configured to enable the detection of recoverable errors. This is accomplished by disabling error correcting codes, device retires and other techniques that mask the occurrence of recoverable errors. Once error generation is enabled, a series. of diagnostic tests are performed in step 1004. In general, any of the testing methodologies discussed previously (i.e., method 700, method 800 or method 900) may be used to perform the diagnostic testing of step 1004. Preferably, however, the testing of step 1004 is performed by writing and reading the sectors in a reserved portion of the disk 202 (i.e., by using method 800). Regardless of the particular testing methodology used, step 1004 preferably tests a large number of sectors.

In step 1008 a tabulation is made of the total number of errors generated during step 1004. This total is then analyzed in step 1006 to determine if the number of errors has increased rapidly since the last execution of step 1008. For the purposes of the present invention, a "rapid increase" means that the increase experienced between successive executions of step 1008 is more than incremental. For example, a "rapid increase" may be defined as a non-linear or exponential increase in the number of errors between successive executions of step 1008. Alternately, a "rapid increase" may be defined in any manner that indicates that the increase in the number of errors between successive executions of step 1008 is inconsistent with normal operation of drive 200.

If the number of errors has not increased rapidly, control passes to step 1010 where the tolerance to the drive to defects is incrementally reduced. Together, steps 1004 through 1010 form a loop that finds the avalanche point of the drive. When this point is reached, step 1008 passes control to step 1012.

In step 1012 the avalanche point is defined to be the total decrease in tolerance that was applied to the drive 202 during the loop of step 1004 through step 1010. This total decrease in tolerance then compared against a first predetermined value in step 1014. If the total is found to be less than the first predetermined value, a warning is issue to the host system in step 1016. This warning indicates that it is unacceptably easy to provoke a large number of errors in the drive 200.

In step 1018, the avalanche point is compared against the last known avalanche point (generally, the last known avalanche point is the avalanche point calculated during the most recent preceding execution of method 1000). If the difference between the avalanche point and the last known avalanche point is found to exceed a second predetermined value, a warning is issue to the host system in step 1020. This warning indicates that it is becoming unacceptably easy to provoke a large number of errors in the drive 200.

In step 1022, the final step of method 1000, the drive 200 is reconfigured to its normal operating configuration. This involves enabling the use of device retries, enabling the use of error correcting codes, as well as enabling any of the other techniques used by the drive 200 to prevent or mask the occurrence of errors. In general, method 1000 is preferably intended be used as a background test, that is run periodically, during times when the drive 200 is otherwise idle.

Figure 11:
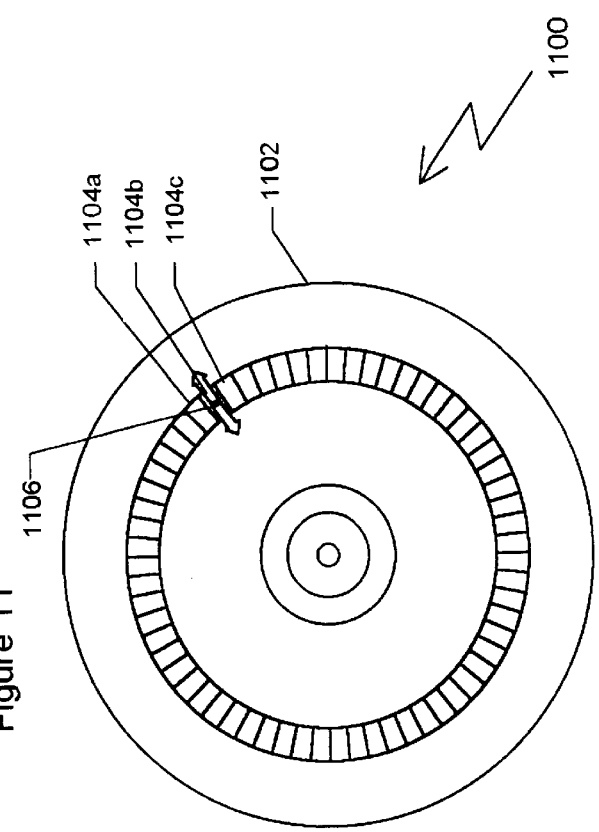
FIG. 11 is an idealized representation of a disk platter as used in the disk drive of the present invention.

Method 1000 implies that the tolerance of the drive 200 to defects within the media of disk 202 may be selectively decreased. Decreasing the tolerance of the disk drive 200 to media defects is accomplished using several methods, the first of which may be more readily appreciated by reference to FIG. 11. In FIG. 11, an idealized disk drive platter is shown and generally designated 1100. Platter 1100 includes a representative track 1102 and representative sectors 1104a, 1104b and 1104c. As may be appreciated, there is an optimal position for reading and writing each sector 1104. The optimal position is a combination of the physical location of read/write head assembly 204 and the timing associated with the read or write operation. In the case of sector 1104b, this position is shown symbolically and designated 1106. Alterations made to position 1106 will decrease the ability of the disk drive 200 to tolerate defects within the media of disk assembly 202. For example, the track offset of read/write head assembly 204 may be moved slightly to position 1106 either to the inside or the outside of track 1102. In either case, the tolerance of disk drive 200 to media defects will be decreased.

Figure 12:
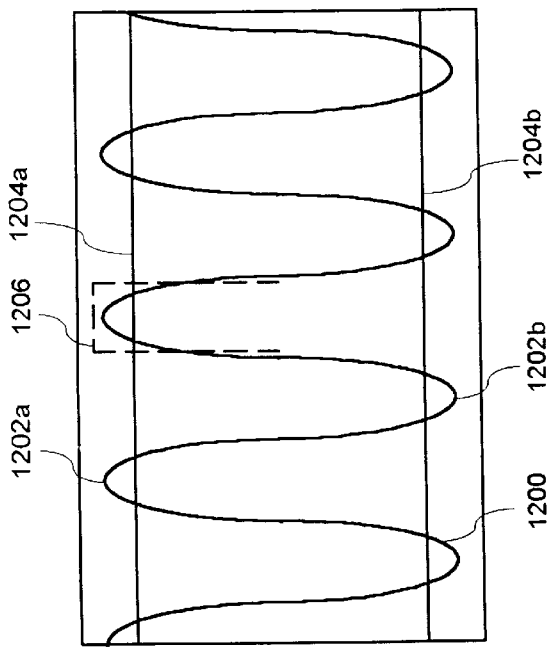
FIG. 12 is an idealized representation of the analog signal generated by a read/write head as used in the disk drive of the present invention.

A second method for decreasing the tolerance of disk drive 200 to media defects involves reconfiguration of the circuitry used by the disk drive 200 during disk read operations. More specifically, during a read operation, read/write head 204 produces an analog signal that corresponds to the magnetic polarization of the particular portion of the disk 202 that is being read. An idealized signal of this type is shown in FIG. 12 and generally designated 1200. Signal 1200 includes peaks, of which peaks 1202a and 1202b are representative. The idealized signal 1200 is converted into a digital signal by a circuit known as a discriminator. In the discriminator, peaks 1202 that exceed a threshold voltage 1204a are transformed into digital ones. Similarly, peaks 1202 that fall below a threshold voltage 1204b are transformed into digital zeros.

Preferably, the discriminator uses a read window, such as the read window 1206 shown in FIG. 12. The read window is used to define the portion of signal 1200 where the discriminator expects that a peak 1202 will occur. The width of the read window 1206 is tailored to optimize operation of the disk drive 200. Specifically, The width of the read window 1206 is tailored to minimize the number of missing bit errors and extra bit errors experienced by the disk drive 200.

Based on the foregoing, it may be appreciated that several methods exist for effecting the output of the discriminator circuit. For example, if the threshold voltage 1204a is increased, fewer peaks 1202 will exceed the threshold voltage 1204a. In terms of the disk 202, there may be portions of the disk 202 that produce an analog signal 1200 that marginally exceeds the threshold voltage 1204a under normal conditions. If the threshold voltage 1204a is increased, however, these portions may be unable to exceed the increased threshold voltage 1204a. In this fashion, the tolerance of the disk drive 200 to portions of the disk 202 that produce marginal voltages may be effectively decreased.

Alternately, if the width of the read window 1208 is altered, there will once again be marginal portions of the analog signal 1200 that will no longer yield the correct digital value. In terms of the disk 202, this corresponds to disk regions that fail to produce the required voltage for the required time period or that fail to produce the required current at the required time. Once again, the tolerance of the disk drive 200 to portions of the disk 202 that produce marginal analog signals 1200 is effectively decreased.

The present invention incorporates a computer disk drive, such as drive 200, that incorporates the failure prediction methods as described in the preceding paragraphs with regard to FIGS. 1 through 12.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for predicting the failure of a disk drive, the method including the steps of:

monitoring errors generated during normal operation of the disk drive;

adding an entry noting each error to an error list stored on a reserved portion of the disk drive; and periodically analyzing each entry in the error list.

2. A method as recited in claim 1 wherein the step of periodically analyzing each entry in the error list analyzes each error to determine if the number of errors has exceeded a first predetermined value.

3. A method as recited in claim 1 wherein the step of periodically analyzing each entry in the error list analyzes each error to determine if the rate of errors has exceeded a second predetermined value.

4. A method as recited in claim 1 further comprising the steps of:

periodically performing diagnostic tests on the disk drive;

monitoring errors generated during the diagnostic tests; and adding an entry for each error to an error list stored on a portion of the disk.

5. A method as recited in claim 4 further comprising the step of reconfiguring the drive to enable the detection of recoverable errors.

6. A method as recited in claim 5 further comprising the step of reconfiguring the drive to a normal operating configuration.

7. A method as recited in claim 4 wherein the diagnostic tests are performed by reading sectors of the disk.

8. A method as recited in claim 4 wherein the disk drive has a list of suspected sectors and the diagnostic tests are performed by reading the suspected sectors.

9. A method as recited in claim 4 wherein the diagnostic tests comprise the steps of:

writing test data into reserved sectors of the disk;

monitoring errors generated during writing of the test data;

reading the test data in the reserved sectors; and monitoring errors generated during the reading of the test data.

10. A method as recited in claim 4 wherein the diagnostic tests comprise the steps of:

saving data from selected sectors of the disk in a reserved portion of the disk;

writing test data in the selected sectors;

monitoring errors generated during writing of the test data;

reading the test data in the selected sectors;

monitoring errors generated during the reading of the test data; and restoring the selected sectors from the reserved portion of the disk.

11. An apparatus for predicting the future failure of a disk drive, the apparatus comprising:

program means for performing diagnostic tests on the disk drive during normal operation of the disk drive;

program means for monitoring errors generated during the diagnostic tests performed during normal operation of the disk drive;

program means for adding an entry of each error to an error list stored on a portion of the disk drive; and program means for periodically analyzing each entry in the error list to determine if the disk drive is likely to fail.

12. An apparatus as recited in claim 11 wherein the program means for periodically analyzing each entry in the error list includes means for determining if number of errors has exceeded a first predetermined value.

13. An apparatus as recited in claim 11 wherein the program means for periodically analyzing each entry in the error list includes means for determining if the rate of errors has exceeded a second predetermined value.

14. An apparatus as recited in claim 11 further comprising program means for reconfiguring the drive to enable the detection of recoverable errors.

15. An apparatus as recited in claim 11 wherein the program means for performing diagnostic tests further comprises program means for reading sectors of the disk.

16. An apparatus as recited in claim 11 wherein the program means for performing diagnostic tests further comprises:

program means for monitoring errors generated during normal operation of the disk drive; and program means for adding an entry for each error to an error list stored on a portion of the disk, the entry including information describing the time of occurrence of the error.

17. An apparatus as recited in claim 16 further comprising a list of suspected sectors and wherein the program means for performing diagnostic tests further comprises program means for reading the suspected sectors.

18. An apparatus as recited in claim 11 wherein the program means for performing diagnostic tests further comprises:

program means for writing test data into reserved sectors of the disk;

program means for monitoring errors generated during writing of the test data;

program means for reading the test data in the reserved sectors; and program means for monitoring errors generated during the reading of the test data.

19. An apparatus as recited in claim 11 wherein the program means for performing diagnostic tests further comprises:

program means for saving data from selected sectors of the disk in a reserved portion of the disk;

program means for writing test data in the selected sectors;

program means for monitoring errors generated during writing of the test data;

program means for reading the test data in the selected sectors;

program means for monitoring errors generated during the reading of the test data; and program means for restoring the selected sectors from the reserved portion of the disk.

20. A method for predicting the failure of a disk drive, the method comprising the steps of:

enabling error detection for the disk drive;

testing sectors in the media of the disk drive;

tabulating the number of errors generated during the step of testing sectors in the media;

reconfiguring the drive to decrease the tolerance of the drive to defects within the media;

repeating the steps of testing sectors in the media, tabulating the number of errors, and reconfiguring the drive to decrease the tolerance of the drive to defects until an avalanche point is reached; and analyzing the avalanche point to determine if the avalanche point has exceeded a first predetermined value.

21. A method as recited in claim 20 further comprising the steps of:

comparing the avalanche point with a last known avalanche point; and determining if the difference between the avalanche point and the last known avalanche point exceed a second predetermined value.

22. A method as recited in claim 20 wherein the testing further comprise the steps of:

writing test data into reserved sectors of the disk;

monitoring errors generated during writing of the test data;

reading the test data in the reserved sectors; and monitoring errors generated during the reading of the test data.

23. A method as recited in claim 20 wherein the disk drive has a read/write head and the step of reconfiguring the drive further comprises the step of adjusting the position of the read/write head to be offset from the position of the sectors within the media of the drive.

24. A method as recited in claim 20 wherein the disk drive has a discriminator circuit with an adjustable sampling window and the step of reconfiguring the drive further comprises the step of adjusting the width of the sampling window to a non-optimal value.

25. A method as recited in claim 20 wherein the disk drive has a read/write head producing an analog signal and a discriminator circuit for digitizing the analog signal, the discriminator circuit detecting inflection points within the analog signal and expecting the analog signal to correspond to a digital one or digital zero within a predetermined period after each inflection point and wherein the step of reconfiguring the drive to decrease the tolerance of the drive further comprises the step of adjusting the pre determined period to a non-optimal value.

26. A method as recited in claim 20 further comprising the step of reconfiguring the drive to a normal operating configuration.

* * * * *